United States Patent [19]

Crute

[11] Patent Number: 4,716,920
[45] Date of Patent: Jan. 5, 1988

[54] ROLL OVER FUEL CAP
[75] Inventor: Billy G. Crute, Connersville, Ind.
[73] Assignee: Stant Inc., Connersville, Ind.
[21] Appl. No.: 1,362
[22] Filed: Jan. 8, 1987
[51] Int. Cl.⁴ .................................... F16K 17/36
[52] U.S. Cl. ................................ 137/39; 137/43; 220/203
[58] Field of Search .............. 137/39, 43; 220/203
[56] References Cited
U.S. PATENT DOCUMENTS

| | | |
|---|---|---|
| 1,893,942 | 1/1933 | Jenson ........................... 137/43 |
| 3,938,692 | 2/1976 | Crute . |
| 3,985,260 | 10/1976 | Evans ........................ 137/43 X |
| 4,000,828 | 1/1977 | Crute et al. . |
| 4,162,021 | 7/1979 | Crute . |

Primary Examiner—Robert G. Nilson
Attorney, Agent, or Firm—Barnes & Thornburg

[57] ABSTRACT

A fuel cap having a pressure-vacuum valve assembly for sealing a vehicle fuel tank is provided. The cap has a normally closed vent to vent the fuel tank, with a first valve member to open the vent when the pressure within the tank reaches a predetermined superatmospheric level. The cap also has a second valve member to open the vent when the pressure within the tank reaches a predetermined subatmospheric level. The cap includes a roll-over valve disposed above the first and second valve members to close the vent when the vehicle and cap are rolled over to a substantially inverted orientation to prevent fuel from spilling out of the cap.

10 Claims, 3 Drawing Figures

ROLL OVER FUEL CAP

BACKGROUND AND SUMMARY OF THE INVENTION

The present invention relates to a vented fuel cap for a vehicle having a pressure-vacuum valve and a roll-over safety valve. More particularly, the present invention relates to a vented fuel cap having a pressure-vacuum valve and a roll-over safety valve mounted axially above the pressure-vacuum valve.

Fuel caps having pressure-vacuum valves and roll-over safety valves are generally known. The pressure-vacuum valve is provided in such fuel caps for venting the fuel tank to the atmosphere when the pressure in the tank exceeds a predetermined, superatmospheric level, and also when the pressure in the tank drops below a predetermined subatmospheric level. The roll-over safety valves are provided to prevent the flow of fuel through the cap if the vehicle should be rolled over to a generally inverted orientation. The pressure-vacuum valve generally includes a pair of valves that are normally closed, and which open automatically in response to predetermined changes in the pressure within the fuel tank. One valve, the pressure valve, functions to release excess vapors in the tank when the pressure exceeds a predetermined level. The second valve, the vacuum valve, functions to control the inhalation of atmospheric air when the pressure in the tank drops below a predetermined subatmospheric level. The pressure-vacuum valve arrangement is provided, and generally required, for protection of the environment.

Examples of known types of fuel caps having pressure-vacuum valves and roll-over safety valves are disclosed in U.S. Pat. No. 4,162,021 to Crute issued July 24, 1979; U.S. Pat. No. 3,985,260 to Evans issued Oct. 12, 1976; and U.S. Pat. No. 3,938,692 to Crute issued Feb. 17, 1976. The fuel caps disclosed in these patents all have a roll-over safety valve that is located below the pressure-vacuum valve of the cap. In these known caps, the roll-over safety valve is configured to be a part of the venting portion of the cap. Therefore, vapor venting from the cap, or air entering through the cap must pass through the roll-over safety valve.

One problem with these known fuel caps is that because the roll-over safety valves are located axially below the pressure-vacuum valve, the cap is generally longer axially than the outer housing of the cap. This extended length generally forces the roll-over safety valve to extend axially beyond the housing of the cap, which places the roll-over safety valve in a position where it is susceptible to breakage or other damage.

Another problem with these known fuel caps is that the roll-over safety valves are generally configured to be a part of the venting means of the cap. Thus the inflowing air, or outflowing vapor is forced to pass around the ball which may, in certain circumstances force the ball axially upwardly to prematurely seal the roll-over safety valve. It is also possible for fuel to splash into the roll-over safety valve to prematurely seal the valve.

One object of the present invention is to provide an improved pressure-vacuum valve venting fuel cap with a roll-over safety valve that is not located in a position where it is susceptible to breakage or other damage.

Another object of the present invention is to provide a pressure-vacuum valve venting fuel cap with a roll-over safety valve that is not a part of the venting means of the cap.

According to the present invention, a pressure-vacuum cap for a vehicle fuel tank having a normally upwardly extending filler neck formed with a peripherally and radially extending sealing surface concentric with the longitudinal axis of the neck is provided. The cap includes a cover and a valve housing providing a passageway extending axially therethrough and having means for connecting the housing to the filler neck. The axially upper portion of the passageway is formed to include a valve seat. The valve housing is also formed to include a peripherally and radially outwardly extending shoulder that has at least one opening formed therethrough, and a radially inwardly extending, axially upwardly facing sealing surface that is disposed around the lower portion of the passageway. A first valve member is disposed within the passageway above the sealing surface and formed to include an aperture therethrough. A first spring means for yieldably urging the first valve member axially downwardly against the sealing surface to close the passageway is provided, the spring means being calibrated to provide for movement of the first valve member axially upwardly away from the sealing surface to open the passageway when the pressure in the filler neck reaches a predetermined superatmospheric level. A second valve member is disposed below the first valve member and is concentric with the aperture in the first valve member. Second spring means for yieldably urging the second valve member axially upwardly to close the aperture in the first valve member are also provided. The second spring means are calibrated to provide for movement of the second valve member axially downwardly away from the first valve member to open the aperture in the first valve member to vent the filler neck and the fuel tank through the passageway when the pressure in the filler neck reaches a predetermined subatmospheric level. Sealing means disposed within the passageway above the first valve member are provided. The sealing means is formed to be received in the valve seat in the upper portion of the passageway when the filler neck is tilted to a substantially inverted orientation to close the passageway.

One feature of the foregoing structure is that the passageway and valve seat in the valve housing and the sealing means disposed within the passageway cooperate to form a roll-over safety valve that is disposed above the pressure-vacuum valve in the cap. One advantage of this feature is that the roll-over valve is located entirely within the housing of the cap, and does not extend axially beyond the lower portion of the housing. Another advantage of this feature is that the cap has a shorter axial dimension than was heretofore possible in such caps.

In preferred embodiments of the present invention, a series of columns are circumferentially spaced around the valve housing above the first valve member and between the first valve member and the valve seat. A circular plate is mounted on the columns and configured to support the sealing means. One feature of the foregoing structure is that, because the columns are spaced apart from each other and the columns support sealing means, the inflow of air and the outflow of vapor are routed around the sealing means to place the sealing means out of the venting path of the cap. One advantage of this feature is that because the sealing means is not part of the venting path of the cap, the sealing means cannot be forced axially upwardly by either excess vapor or splashing fuel to prematurely seal the valve seat and the roll-over safety valve.

Also in preferred embodiments of the present invention, the sealing means comprises a ball that has a density greater than the fuel in the fuel tank, and the plate supporting the ball includes a centrally disposed opening formed therein that is sized to capture a portion of the ball. One feature of the foregoing structure is that when the ball is not in use to seal the valve seat when the cap is rolled over to a substantially inverted position, the ball is captured in the support plate in a non-use position. One advantage of this feature is that the ball is not permitted to move within the roll-over safety valve when the cap is in the normal position. This greatly lessens the chances that the ball can be bounced axially upwardly to prematurely seal the valve seat to close off the venting capability of the cap.

Additional objects, features, and advantages of the invention will become apparent to those skilled in the art upon consideration of the following detailed description of preferred embodiments exemplifying the best mode of carrying out the invention as presently preceived.

BRIEF DESCRIPTION OF THE DRAWINGS

The detailed description particularly refers to the accompanying figures in which.

DETAILED DESCRIPTION OF THE DRAWINGS

Figure 1:
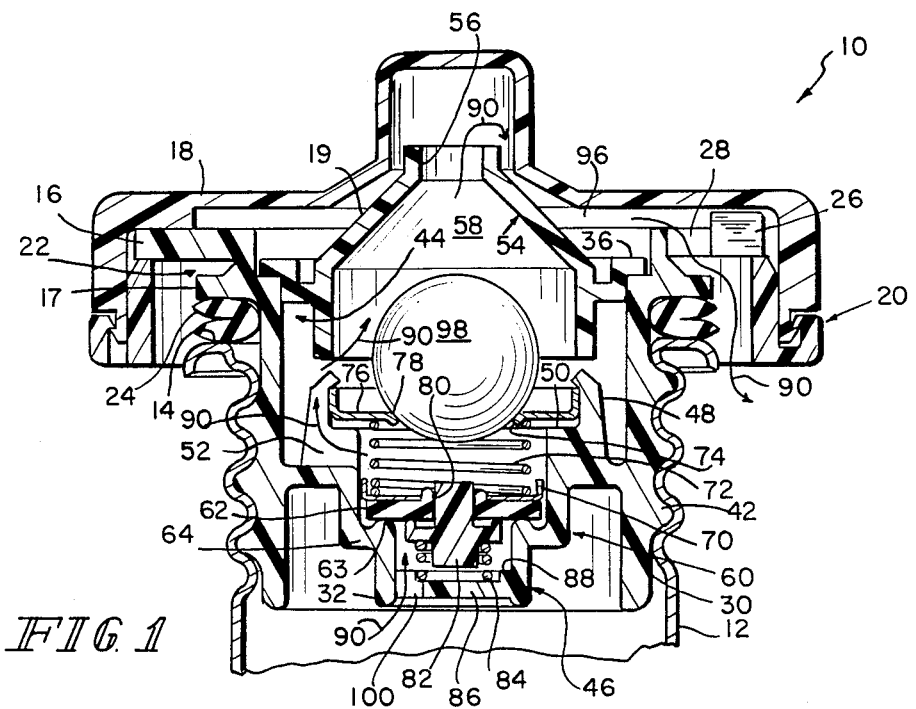
FIG. 1 is a transverse sectional view showing one embodiment of the present invention.

Referring now to the drawings, and particularly to FIG. 1, a fuel cap 10 is shown for closing a filler neck 12 of the type having a peripherally and radially extending, upwardly facing sealing surface 14 concentric with the axis of the neck 12. The cap 10 includes a cover 18, and a valve housing or body 42. The valve housing 42 includes a radially outer, axially extending wall 30 and a radially inner, step-shaped wall 32. The outer wall 30 includes threads formed on its radially outer surface that are adapted to engage threads formed on the filler neck 12. The outer wall 30 also includes a first radially outwardly turned, peripherally extending flange 16 disposed above a second radially outwardly turned, peripherally extending flange 17. Flange 16 includes a conventional override pawl 26 and an opening 28.

A radially inwardly extending groove 22 is formed in the outer wall 30 between flange 16 and flange 17. The groove 22 is formed in such a manner that the outer wall 30 is weakened somewhat between flange 16 and flange 17. In the event of an impact of sufficient strength to the cover 18, the cover 18 and the flange 16 may be displaced from the remainder of the cap 10. Because flange 17 is located axially below groove 22, the flange 17 and remaining portion of housing 42 will remain intact to seal filler neck 12.

The cover 18 is rotationally attached to the flange 16 by a ring-lock 20. An outer gasket 24 encircles the outer wall 30 axially below the flange 17 to cooperate with the sealing surface 14 of the filler neck 12 to sealingly engage the cap 10 to the filler neck 12. Twisting of the cover 18 conventionally rotates the fuel cap 10 to move the valve housing 42 axially downwardly to capture the outer gasket 24 between the filler neck 12 and the flange 17.

The valve housing 42 is a generally cylindrically-shaped, hollow shell molded preferably from plastic. The valve housing 42 is divided into two halves, an axially upper portion 44 and an axially lower portion 46. The axially upper portion 44 of the housing 42 includes a cup 19 which includes an upright side wall 34 which, at its upper edge, terminates in an axially upwardly extending, concentric reduced portion 54 which has a centrally disposed vent opening 56 formed therein. The cup 19 also includes a peripherally and radially outwardly extending flange 36 that is attached to the radially inner shoulder of flange 17 by a conventional method, such as gluing or ultrasonic welding.

A series of circumferentially spaced columns 48 are collectively disposed axially below the cup 19 in the housing 12. The columns 48 each have a radially inwardly extending ledge 50 which collectively support a ball retainer 76, the ball retainer 76 having an opening 78 formed therethrough. The ball retainer 76, upright side wall 34, and reduced portion 54, cooperate to define an axially upper chamber 58 in the axially upper portion 44 of the valve housing 42. A ball 98 is disposed within the upper chamber 58 and is formed from steel, or other suitable material. The ball 98 has a diameter greater than both the ball retainer opening 78 and the vent opening 56. It will be understood that when the fuel cap 10 is in a substantially upright position (FIG. 1), the ball 98 will be normally seated in the ball retainer opening 78.

The axially lower portion 46 of the valve housing 42 includes a step-shaped inner wall 32 which extends radially inwardly and axially downwardly from the outer wall 30 in a step-wise fashion forming an upwardly facing enclosure. The lower portion 46 also includes a floor 86 having at least one vent opening 100 formed therein. The inner wall 32 is provided with a peripherally and radially inwardly extending ledge 64 which forms a pressure valve seat 60.

A pressure-vacuum valve means is provided in the lower portion 46 of the housing 42 to control venting of pressure and vacuum which may be developed in the fuel tank. The pressure-vacuum valve means includes a disc-like valve member 62 and a vacuum plunger 82. A spring retainer 70 is conventionally placed above the valve member 62. A coil compression spring 72 is disposed above the valve member 62 and serves as a pressure spring means yieldably urging the valve member 62 into closing engagement with the valve seat 60. The upper end of the spring 72 is secured around a concentric, downwardly extending ridge 74 on the underside of the ball retainer 76 that is centered axially above the spring cup 70.

The valve member 62 is provided with a concentric opening 80 extending therethrough. The vacuum plunger 82 is yieldably urged axially upwardly against the lower surface of the valve member 62 by a spring 84. The vacuum plunger 82 extends through the opening 80 to normally seal the opening 80 when the vacuum plunger 82 is at its upper limit. In the illustrative embodiment, the lower end of the spring 84 rests upon the floor 86 which is provided with a peripherally and upwardly extending guide ridge 88 for holding the lower end of the spring 84 securely in position.

In operation, the fuel cap 10 is installed in the filler neck 12 of a vehicle in a known manner so that the flange 17 of the fuel cap 10 engages sealing surface 14 of the filler neck 12. The outer gasket 24, which encircles the valve housing 42 below the flange 17, contacts the sealing surface 14 to effect a seal between the fuel cap 10 and the filler neck 12.

In FIG. 1, the fuel cap 10 and the filler neck 12 are shown in a normal, upright position. In the upper chamber 58, the ball 98 is located over the ball retainer opening 78 in a position where it will normally not affect the venting capability of the fuel cap 10. In the lower portion 46 of the valve housing 42, the valve member 62 is in its lowest position resting on the pressure valve seat 60. The vacuum valve plung 82 is raised upwardly by spring 84 to a position where it closes off the vacuum vent opening 80.

It will be understood that it is sometimes desirable to let the vapor from the fuel in the vehicle fuel tank (not shown) vent to the atmosphere when the pressure within the tank reaches a predetermined superatmospheric level. When the pressure in the fuel tank exceeds a predetermined, superatmospheric level, the spring 72 will compress to permit vapor in the tank to vent between the valve member 62 and the valve seat 60. The vapor is permitted to flow upwardly and outwardly through spaces 52 formed between the circumferentially spaced columns 48, through the upper chamber 58 and the vent opening 56, then radially outwardly and downwardly through openings 96 formed between the cover 18 and the outside surface of cup 19, and finally through opening 28 in flange 16. It will be understood that this path, illustrated by arrows 90 in FIG. 1, comprises a vapor release means. Also, when the pressure in the tank drops below a predetermined, subatmospheric level, the calibrated spring 84 compresses to permit air to move from the atmosphere into the vent opening 56 and through spaces 52, vacuum vent opening 80, and vent opening 100 into the vehicle fuel tank.

Figure 2:
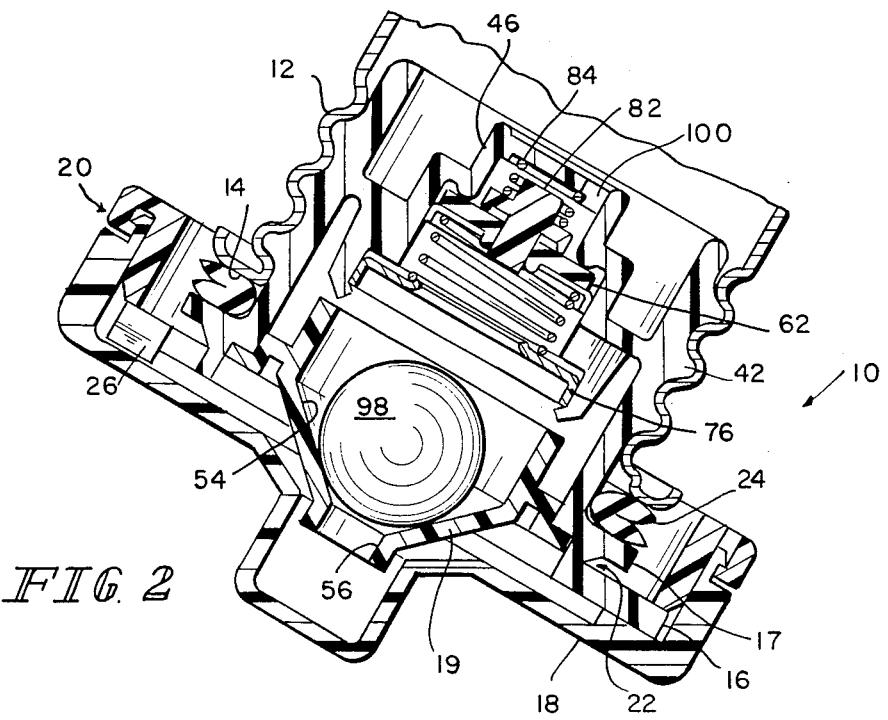
FIG. 2 is a transverse sectional view showing the embodiment of FIG. 1 in a substantially inverted orientation.

It will be appreciated that there is a necessity to close this vapor release means whenever there is a possibility that fuel in the tank will spill or splash through the vapor release means because of an unusual orientation of the vehicle. FIG. 2 shows the fuel cap 10 and the filler neck 12 in a position where the vehicle has rolled to a substantially inverted position. The ball 98, being heavier than the fuel, will roll down the reduced portion 54 of the cap 19 to seal the vent opening 56, and thus to seal the vapor release means. This action prevents fuel from flowing through the vapor release means when the vehicle is in this orientation.

As previously discussed, when the cover 18 is subjected to an impact of sufficient strength, the housing 42 will fracture along groove 22 and allow the cover 18 and flange 16 to be displaced from the cap 10. Because flange 17 is located axially below groove 22, the remaining portion of the housing 42, including the sealing means, will remain intact to seal the filler neck 12.

Figure 3:
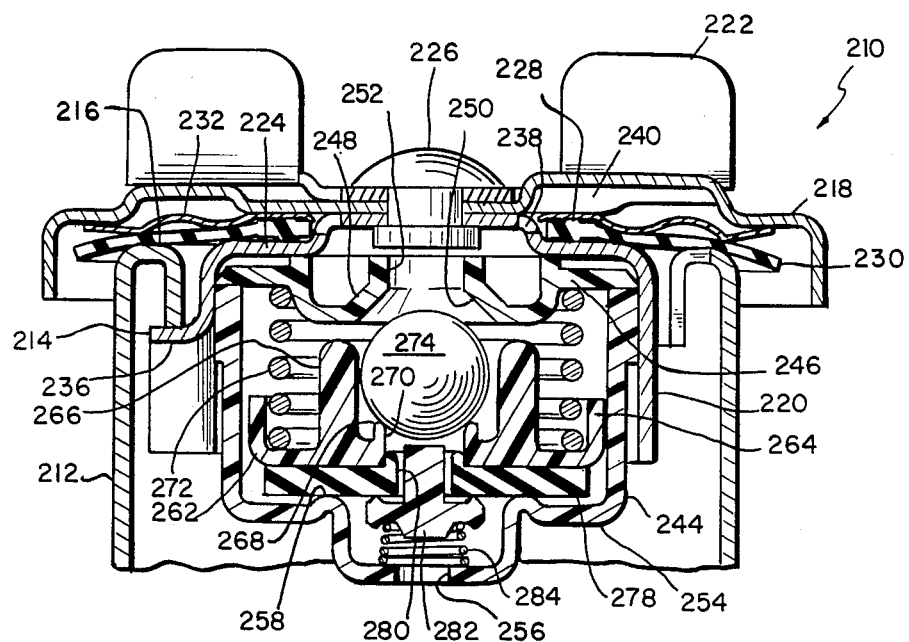
FIG. 3 is a transverse sectional view showing another embodiment of the present invention.

Referring now to FIG. 3, FIG. 3 shows another embodiment of the present invention, and specifically a fuel cap 210 that is designed to be fitted into a filler neck 212 having a bayonet-type locking mechanism. The filler neck 212 includes an axially downwardly turned, peripherally extending flange 214 which has a cam profile edge as will be discussed later.

The cap 210 has an outer cover 218 to which a cup 220 and a handle 222 are rigidly fastened by means of a concentric rivet 226. The cup 220 is an axially downwardly opening, generally cylindrical cup that provides an upper shoulder 224 that is spaced axially apart from the outer cover 218 to define a space therebetween. Disposed within this space is an inner gasket 228, an outer gasket 230, and a diaphragm spring 232. The gasket 230 is configured to bear against both the shoulder 224 of the cup 220 and the sealing surface 216 of the filler neck 212 when the cap 210 is engaged with the filler neck 212 to provide a seal between the cup 220 and the filler neck 212. Both of the gaskets 228, 230 may be formed from synthetic rubber, and the diaphragm spring 232 may be formed from stainless steel or brass. The diaphragm spring 232 is configured to yieldably urge the outer peripheral edge of the outer gasket 230 axially downwardly.

The cup 220 is formed with radially outwardly extending ears 236 (only one of which is shown) which conventionally pass axially downwardly through notches in the sealing surface 216 in the filler neck 212 to engage the cam profile edge of the flange 214. Twisting of the outer cover 218 by the handle 222 conventionally rotates the cap 210 and causes the ears 236 to cooperate with the cam profile edge of the flange 214 to move the cup 220 axially downwardly to press the gasket 230 axially downwardly against the sealing surface 216. The cup 220 has an opening 238 formed therein between the rivet 226 and the shoulder 224. The opening 238 communicates with a space 240 formed between the outer cover 218 and the diaphragm spring 232 to provide a portion of a venting path between the cap and the atmosphere. This venting path will be discussed in greater detail later.

A valve body 244 is disposed within the downwardly facing cup 220 to extend axially downwardly into the filler neck 212. The valve body 244 is circular in shape and includes a centrally disposed, reduced diameter portion 248 that is formed to include a centrally disposed opening 252. The reduced diameter portion 248 and opening 252 cooperate to form an axially downwardly facing valve seat 250. The valve body 244 also includes a lower portion 254 having a radially inwardly extending surface that is formed to include an axially upwardly extending circular ridge 258. A vent opening 256 is formed in the lower portion 254 to permit venting communication between the interior of the valve body 244 and the fuel tank (not shown).

A retaining member 262 is disposed within the valve body 244 and includes an axially upwardly extending, circular outer wall 264, an axially upwardly extending, circular middle wall 266, and an axially upwardly extending, circular inner wall 268. The space between the outer wall 264 and the middle wall 266 is configured to receive the lower end of a coil spring 272 that extends axially upwardly from the retaining member 262 to the upper portion 246. A ball 274 is disposed within the valve body 244 and normally rests between the middle wall 266 and directly upon the shorter inner wall 268. The circular inner wall 268 forms an opening 270 that the ball 274 normally seals. The larger middle wall 266 serves to retain the ball 274 when the ball 274 is unseated from the inner wall 268, such as when the cap 210 and filler neck 212 are in a substantially inverted orientation.

A pressure valve 278 having a centrally disposed opening 280 is positioned between the lower surface of the retaining member 262 and the ridge 258. It will be understood that the spring 272 and the retaining member 262 cooperate to normally urge the pressure valve 278 axially downwardly against the ridge 258 to prevent any venting between the pressure valve 278 and the ridge 258. A vacuum valve 282 is disposed within the opening 280 of the pressure valve 278 to normally seal the opening 280. The vacuum valve 282 is normally biased axially upwardly to seal the opening 280 by a coil spring 284 that is positioned between the lower surface of the vacuum valve 282 and the lower portion 254 of the valve body 244 near the vent opening 256.

The pressure valve 278 and the vacuum valve 282 function in a manner similar to the valve member 62 in the vacuum plunger 82 in the embodiment shown in FIGS. 1 and 2 to permit the cap 210 to control venting of pressure and vacuum that may be developed in the fuel tank. When the pressure in the fuel tank reaches a predetermined, superatmospheric level, or a predetermined, subatmospheric level, the pressure valve 278 or the vacuum valve 282, respectively will be activated to open a venting path from the fuel tank. It will be understood that the venting path comprises the path through the vent opening 256, through the valve body 244, through the openings 252 and 238, through the space 240, and to the atmosphere. It will be understood that it is necessary to seal this venting path when the cap 210 and filler neck 212 are oriented in a substantially inverted orientation (not shown). When the cap 210 and filler neck 212 are in this orientation, the ball 274 acts in a manner similar to the ball 98 in the embodiment shown in FIGS. 1 and 2 to seal the valve seat 250 to block the above described venting path.

As can be seen from the above discussion, the fuel caps of the present invention permit fuel vapor to vent through the vapor release means when the vehicle is in a normal upright position and is operating under normal conditions. Yet, the invention still provides roll-over protection preventing fuel spillage when the vehicle is in a substantially inverted position.

Although the invention has been described in detail with reference to preferred embodiments and specific examples, variations and modifications exist within the scope and spirit of the invention as described and defined in the following claims.

What is claimed is:

1. A pressure-vacuum cap for a vehicle fuel tank having a normally upwardly extending filler neck formed with a peripherally and radially extending sealing surface concentric with the longitudinal axis of said neck, the cap comprising a cover;

a valve housing providing a passageway extending axially therethrough and including means for connecting said housing to said filler neck, the axially upper portion of said passageway formed to include a valve seat, said valve housing formed to include a peripherally and radially outwardly extending shoulder having at least one opening formed therethrough, said valve housing also formed to include a radially inwardly extending, axially upwardly facing sealing surface disposed around the lower portion of said passageway, a first valve member disposed within said passageway above said sealing surface, said first valve member formed to include an aperture therethrough, first spring means to yieldably urge said first valve member axially downwardly against said sealing surface to normally close said passageway, said first spring means being calibrated to provide for movement of said first valve member axially upwardly away from said sealing surface to open said passageway when the pressure in said filler neck reaches a predetermined superatmospheric level, a second valve member disposed below said first valve member and concentric with said aperture in said first valve member, second spring means to yieldably urge said second valve member axially upwardly to normally close said aperture in said first valve member, said second spring means being calibrated to provide for movement of said second valve member axially downwardly away from said first valve member to open said aperture in said first valve member to vent said filler neck and fuel tank through said passageway when the pressure in said filler neck reaches a predetermined subatmospheric level; and sealing means disposed within said passageway above said first valve member and formed to be received in said valve seat in the upper portion of said passageway when said filler neck is tilted to a substantially inverted orientation to close off said passageway.

2. The cap of claim 1, wherein said upper portion of said passageway is formed to include an axially upwardly and radially inwardly extending concentric reduced portion of said reduced portion including a centrally disposed opening formed therein.

3. The cap of claim 1, wherein said sealing means comprises a ball disposed between said first valve member and said reduced portion, said ball having a density greater than the fuel in the fuel tank.

4. The cap of claim 3, further comprising, a series of columns circumferentially spaced around said valve housing above said first valve member and between said first valve member and said reduced portion, and a circular plate mounted on said columns to support said ball.

5. The cap of claim 4, wherein said plate is formed to include a centrally disposed opening, said opening being sized to capture a portion of said ball.

6. The cap of claim 5, wherein said first valve member, said plate and captured ball, and said columns define a chamber within said valve housing.

7. The cap of claim 6, wherein said columns are spaced apart to form slots, said slots cooperating to place said chamber in venting communication with said passageway.

8. A pressure-vacuum cap for a vehicle fuel tank having a normally upwardly extending filler neck, the cap comprising a cover, a valve housing providing a central passageway having a lower, middle, and upper portion extending therethrough, and including means for connecting said housing to said filler neck, said valve housing formed to include a peripherally and radially outwardly extending shoulder, said shoulder having at least one opening formed therethrough, said shoulder being configured to engage said cover, said valve housing also formed to include a radially inwardly extending, axially upwardly facing first sealing surface disposed around the lower portion of said passageway, an axially upwardly and radially inwardly extending funnel-shaped member bridging the upper portion of said passageway, said member formed to include a centrally disposed opening therethrough, said opening formed to include a downwardly facing second sealing surface;

a first valve member disposed within said passageway above said first sealing surface, said first valve member formed to include an aperture therethrough, first spring means to yieldably urge said first valve member axially downwardly toward said first sealing surface to normally close said passageway, said first spring means being calibrated to provide for movement of said first valve member axially upwardly away from said first sealing surface when the pressure in said filler neck reaches a predetermined, superatmospheric level to open said passageway, a second valve member disposed below said first valve member and concentric with said aperture in said first valve member, second spring means to yieldably urge said second valve member axially upwardly to normally close said aperture in said first valve member, said second spring means calibrated to provide for movement of said second valve member axially downwardly away from said first valve member to open said aperture in said first valve member when the pressure in said filler neck reaches a predetermined subatmospheric level to vent said filler neck, a ball disposed above said first valve member and between said first valve member and said funnel-shaped member to seat in said second sealing surface to close said passageway when the filler neck and the cap are rolled over to a substantially inverted orientation, whereby fuel from said fuel tank is prevented from flowing through said passageway when the filler neck and the cap are in the substantially inverted orientation.

9. The cap of claim 8, further comprising means for supporting said ball at a position above said first valve member in said middle portion of said passageway.

10. The cap of claim 9, wherein said support means is formed to include slots therethrough to permit venting communication between said lower portion and said upper portion of said passageway.

* * * * *